Feb. 27, 1940.     J. P. SPANG     2,191,732
MEAT-SLITTING MACHINE
Filed May 17, 1938     2 Sheets-Sheet 1

Inventor.
Joseph P. Spang
by Heard Smith & Tennant
Attys.

Feb. 27, 1940. J. P. SPANG 2,191,732
MEAT-SLITTING MACHINE
Filed May 17, 1938 2 Sheets-Sheet 2
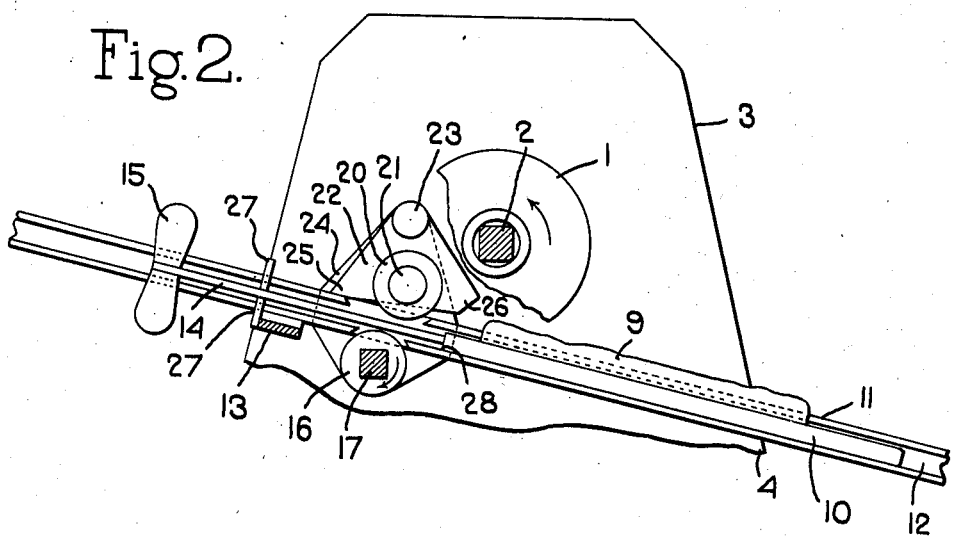
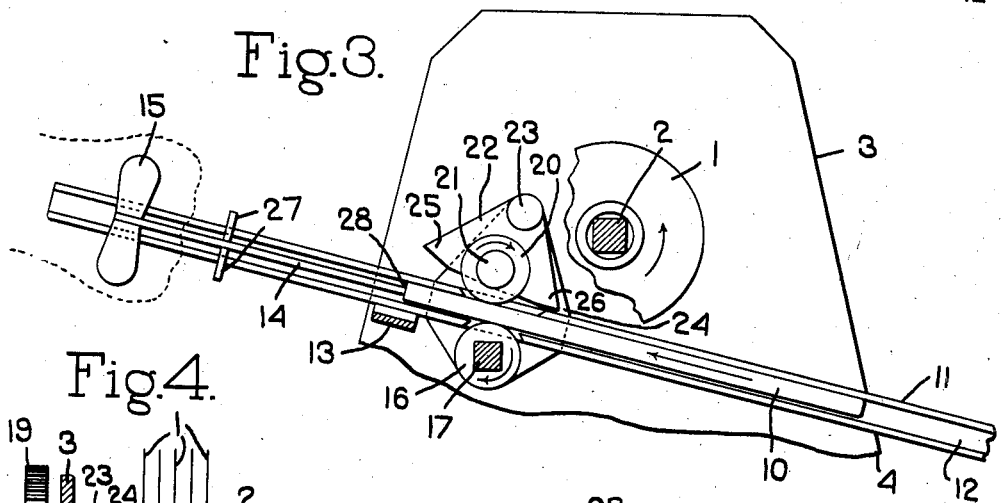
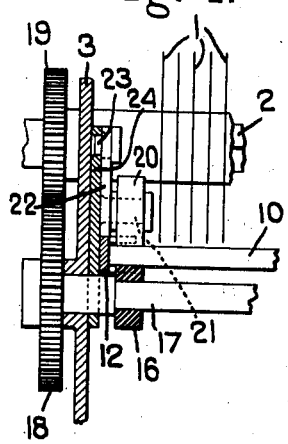
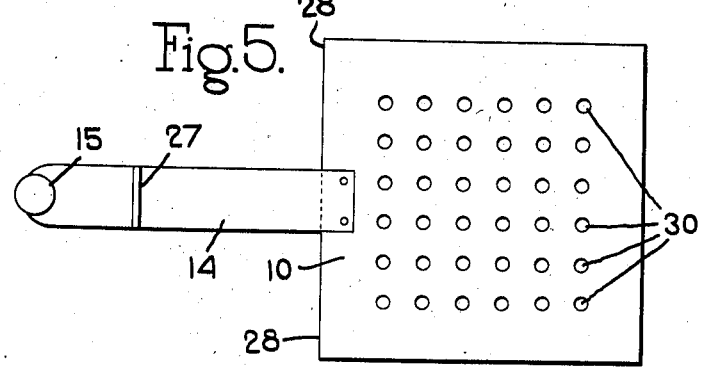
Inventor.
Joseph P. Spang
by Heard Smith & Tennant.
Attys.

Patented Feb. 27, 1940

2,191,732

UNITED STATES PATENT OFFICE 2,191,732

MEAT-SLITTING MACHINE

Joseph P. Spang, Quincy, Mass., assignor to Cube Steak Machine Company, Inc., Boston, Mass., a corporation of Massachusetts Application May 17, 1938, Serial No. 208,389

7 Claims. (Cl. 17—27)

This invention relates to meat slitting machines of that type which embodies a set of rotary meat slitting knives and a meat-supporting table movable back and forth beneath the knives and operating to feed to the knives the slice of meat to be slit.

In the operation of a meat slitting machine of this type it is desirable that the meat should be fed past the knives at a speed slower than the peripheral speed of the knives so that the latter may act on the knives with a draw cut.

It is one of the objects of my present invention to provide a novel meat slitting machine having the rotary slitting knives and a meat-supporting plate, together with means for giving the plate a controlled feeding movement past the knives at a speed slower than the peripheral speed of the knives, thereby to produce the desired draw cut action of the knives, which means is inoperative during the return movement of the table so that the meat-supporting plate is free to be returned to its initial position manually by the operator.

Further objects of the invention are to provide various improvements in meat slitting machines which will be more fully hereinafter set forth and then pointed out in the claims.

In the drawings herein I have illustrated a selected embodiment of the invention.

In the drawings:

Fig. 2 is a fragmentary sectional view showing the position of the meat-supporting table after the slice of meat has been fed past the knives;

Fig. 3 is a fragmentary sectional view similar to Fig. 2 but showing the position of the parts during the manual return movement of the meat-supporting plate;

Fig. 4 is a fragmentary sectional view on the line 4—4, Fig. 1;

Fig. 5 is a plan view of the meat-supporting plate.

Figure 1:
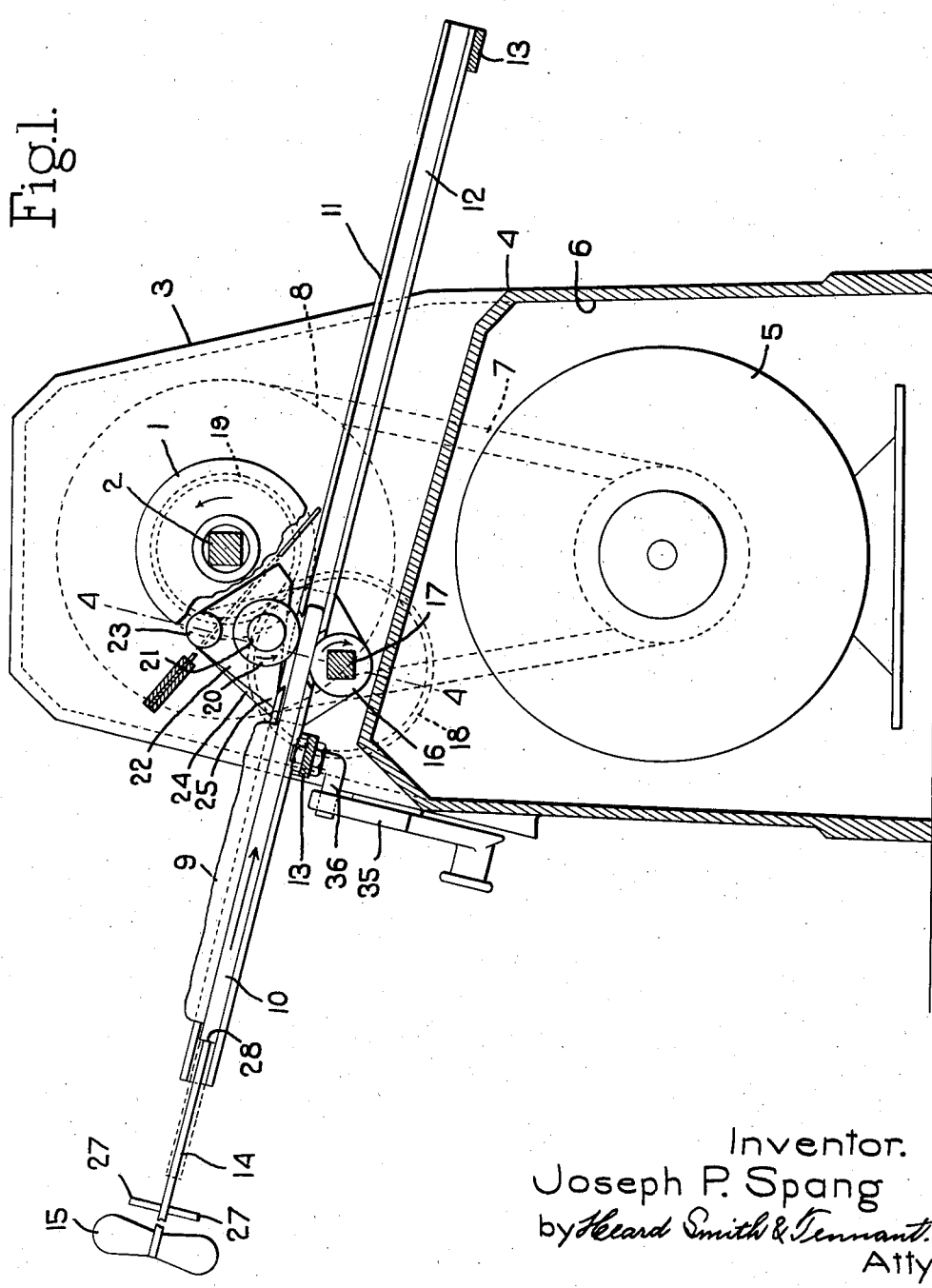
Fig. 1 is a vertical sectional view through a meat slitting machine embodying my invention.

In the drawings the rotary knives for slitting the meat are shown at 1. These knives are mounted on a knife shaft 2 which is journalled in spaced side portions 3 of a frame 4, knives 1 being located between the two side portions 3, as usual in meat slitting machines of this type.

Any suitable means for rotating the knives may be employed, the means herein shown being a motor 5 which is housed in the hollow base portion 6 of the frame, the shaft of the motor being connected by a driving belt 7 to a belt pulley 8 that is fast on the knife shaft 2.

The meat-supporting plate by which the slice 9 of meat to be slit is supported during the meat slitting operation is shown at 10. This plate is movable back and forth beneath the knives 1 between a loading position and an unloading position, and is guided in its back and forth movement by a suitable guiding member indicated generally at 11. The guiding member shown comprises two opposed channel members, one of which is shown at 12. Said channel members embrace the side edges of the plate 10 and thus form a guide therefor. These channel members 12 are connected together by cross-ties 13 and together they form a rigid guide for the meat-supporting plate 10. In this embodiment of the invention the meat-supporting plate 10 is manually controlled, but provision is made for giving said plate a regulated feeding movement past the knives during the meat slitting operation and at such a speed relative to the peripheral speed of the knives that the latter will act on the meat with a draw cut. This meat-supporting plate 10 is provided with a stem 14 which terminates in a suitable handle element 15 by which the plate is manually manipulated.

This meat-supporting plate 10 is separable from the machine and may be introduced by the operator into the upper or left hand end of the guide member 11 shown in Fig. 1. While the plate is in its loading position, which is the dotted line position in Fig. 1, the slice 9 of meat to be slit is placed on the plate 10. The operator then gives said plate 10 an initial forward movement manually by means of the handle 15. As this initial manual forward movement of the plate 10 proceeds said plate become operatively engaged by a plate feeding means which continues the forward feeding movement of the plate until the slice 9 of meat has been carried past the knives into an unloading position, as indicated in Fig. 2, in which position the plate is disengaged from the plate feeding means. This passing of the meat past the knives will produce a plurality of parallel slits in the meat. The operator then removes the partially slit meat from the meat-supporting plate and then returns the plate manually to loading position shown in dotted lines in Fig. 1, and during such manual return movement the plate feeding means is inoperative.

The plate feeding means herein illustrated comprises a pair of feed rolls adapted to engage the underside of plate 10 at its opposite edges, one of said feed rolls being shown at 16. These feed rolls are fast on a feed shaft 17 which is journalled to the frame and which is positively rotated by some suitable mechanism. As herein shown this feed shaft 17 is driven from the knife shaft 2, said feed shaft having a gear 18 thereon which meshes with and is driven by a gear 19 fast on the knife shaft. These feed rolls are preferably made of some yielding friction material such as rubber. The feed rolls are so located that they are out of operative engagement with the plate 10 when the latter is in either its loading position shown in dotted lines, Fig. 1, or in its unloading position in Fig. 2. Cooperating with each feed roll 16 is a presser roll 20 adapted to engage the upper side of the plate 10 at its edge, and the presser rolls 20 are so mounted that during the forward feeding movement of the plate 10 they act to press said plate firmly against the feed rolls as shown in Fig. 1, so that the feed rolls will have sufficient frictional engagement with the plate to feed it forward at the same speed as the surface speed of the rolls. During the return movement of the plate 10 by the operator the presser rolls 20 become inoperative so that the plate 10 can be freely pulled backwardly manually.

Each presser roll 20 is pivotally mounted on a stud 21 that is carried by a swinging plate 22 that is pivotally mounted at 23 to a cheek piece 24 rigid with the guiding element 11. The swinging plate 22 has a limited swinging movement which is sufficient to carry the presser roll 20 from one side to the other of a line drawn through the pivot 23 and the axis of the feed shaft 17.

Each swinging plate 22 is formed with a stop portion 25 which is adapted to engage the guiding member 11 and thus limit the swinging movement of the plate 22 and presser roll 20 to the right, and said plate 22 is provided with another stop portion 26 on the opposite side, which is also adapted to engage the guiding member 11 and limit the swinging movement of plate 22 and presser roll 20 to the left.

In using the machine the meat-supporting plate is withdrawn backwardly into the loading position shown in dotted lines Fig. 1 and a slice 9 of meat is then placed thereon. The operator then gives the plate 10 an initial manual forward movement sufficient to bring the front of the plate in contact with the feed rolls 16 and to enter the plate between said feed rolls and the presser rolls. The feed rolls are constantly rotating clockwise in Fig. 1 and the engagement of the front portion of the plate with the feed rolls and presser rolls causes the presser rolls to swing into their operative position shown in Fig. 1, a position which is determined by the engagement of the stop portion 25 of each swinging plate 22 with the guide 11. In this position the centre of the presser roll is situated at the right of a line drawn through the pivot 23 and the axis of the feed shaft 17, and the position of the presser rolls is such that they serve to press plate 10 firmly against the yielding feed rolls 16, with the result that the rotation of the feed rolls 16 operate to feed the plate 10 forwardly. The speed of this feeding movement is the same as the surface speed of feed rolls 16 and the gearing for driving the rolls is such that the surface speed of the feed rolls is considerably slower than the peripheral speed of the knives. As a result the knives act on the meat with a draw cut.

As soon as the operator has manually manipulated the plate to bring it into operative engagement with the feed rolls, said feed rolls assume control of the plate 10 and continue the feeding movement thereof at the regulated speed, thereby to carry the plate, with the meat thereon, past the knives and into the unloading position shown in Fig. 2, in which position the plate is out of operative engagement with the feed roll. The stem 14 of the meat-supporting plate is provided with a stop projection 27 adapted to engage the cross-piece 13 at the front of the machine and thereby limit the feeding movement of the plate as illustrated in Fig. 2.

The passing of the plate 10 beneath the knives and into the position shown in Fig. 2 results in slits being cut in the meat by the knives 1, as will be understood.

After the meat-supporting plate with its slice 9 of meat thereon has arrived at unloading position the operator will remove the slice from the plate 10 and then manually return the plate to its initial or loading position shown in dotted lines, Fig. 1. In the unloading position shown in Fig. 2 the plate has been carried entirely free from the feed rolls and presser rolls, and as the operator pulls the plate backwardly by the handle 15 the edge 28 of the plate will engage the presser roll and swing it to the left into the position shown in Fig. 3. When in the position shown in Fig. 3 the presser roll merely rolls along on the top of the returning plate 10 without applying any pressure thereto and thus the plate is free to be given its return movement by the operator, notwithstanding the fact that the feed rolls 16 are constantly rotating in a direction tending to feed the plate forwardly instead of backwardly. However, since during the backward movement of the plate the presser rolls have no pressing action against the plate the latter can be freely returned manually to its initial or loading position.

After the slice 9 of meat has had one series of slits formed therein and has been removed from the plate 10, said slice may again be placed on the plate when the latter is in its loading position shown in dotted lines, Fig. 1, and the plate may then be given a second forward feeding movement to cause a second series of slits to be cut in the meat, which second series of slits will cross those of the first series. This second series of slits may be formed either on the same side of the slice 9 as the slits of the first series, or on the opposite side of said slice 9.

The meat-supporting plate 10 is shown as provided with apertures 30 into which the meat sinks somewhat so that the slice will be securely held on the plate.

This plate 10 is reversible and can be used either side up and the stem 14 is, therefore, shown as provided with two stop projections 27, one on each side thereof, so that one stop projection will always be in position to engage the cross-piece 13, as shown in Fig. 2, when the plate has reached the end of its forward stroke.

I claim:

1. A meat slitting machine comprising a set of rotary slitting knives, means to rotate the knives, a guiding member beneath the knives, a meat-supporting plate movable on the guiding member between a loading position on one side of the knives and a position of rest on the other side of the knives, said plate having provision for manual operation, a driven feed roll, a presser roll cooperating with the feed roll to feed the plate forward, and a swinging support for the presser roll which provides a movement thereof between an operative and an inoperative position, said presser roll normally occupying its operative position, whereby when the meat-supporting plate is manually introduced to the presser roll and feed roll, said rolls cooperate to feed the plate forward to its position of rest, said swinging support providing a movement of the presser roll from its operative to its inoperative position by the initial manual backward movement of the plate.

2. A meat-slitting machine comprising a set of rotary slitting knives, means to rotate the knives, a guiding member, a meat-supporting plate capable of back and forth movement on said guiding member between a loading position on one side of the knives and an unloading position on the other side of the knives, and a one-way plate-feeding means operative to give the plate a forward feeding movement only and to feed said plate from said loading position to the unloading position, said plate, when in unloading position, being out of operative engagement with the feeding means, and having means by which it may be manually moved, said plate-feeding means being rendered inoperative by an initial manual backward movement of the plate from its unloading position.

3. A meat slitting machine comprising a set of rotary knives, means to rotate the knives, a guiding member, a meat-supporting plate movable back and forth on the guiding member between a loading position on one side of the knives and an unloading position on the opposite side of the knives, said plate having provision for manual operation thereof, and plate-feeding means which is out of operative engagement with the plate when the latter is in either its loading or its unloading position but which is rendered operative by an initial manual movement of the plate to feed the latter past the knives at a speed slower than the peripheral speed of the knives, said means being rendered inoperative by a manual backward movement of the plate from its unloading position.

4. A meat-slitting machine comprising a set of rotary knives, means to rotate the knives, a guide member beneath the knives, a meat-supporting plate movable on the guide member between a loading position at one side of the knives and an unloading position at the other side of the knives, and a one-way plate-feeding means which is out of operative engagement with the plate when the latter is in either its loading position or its unloading position but which is rendered operative by an initial manual movement of the plate from its loading position to feed said plate past the knives into the unloading position, said plate-feeding means being rendered inoperative by a manual backward movement of the plate from its unloading position.

5. A meat-slitting machine comprising a set of rotary knives, means to rotate the knives, a guiding member beneath the knives, a meat-supporting plate movable back and forth on said guiding member between a loading position on one side of the knives and an unloading position on the other side of the knives, said plate having provision for manual operation, a feed roll for feeding the plate forward, means to rotate the feed roll, said feed roll being located between the loading and unloading positions of said plate and out of operative engagement with said plate when the latter is in either of said positions, and means rendered operative by an initial manual forward movement of said plate from its loading position to operatively connect said plate with the feed roll, whereby a continued forward feeding movement of said plate for slitting the meat is given to it by said feed roll, said means being rendered inoperative by an initial manual backward movement of the plate from the unloading position.

6. A meat-slitting machine comprising a set of rotary knives, means to rotate the knives, a guide member beneath the knives, a meat-supporting plate movable back and forth on said guide member between a loading position on one side of the knives and an unloading position on the other side of the knives, said plate having provision for manual operation, a constantly driven feed roll for feeding the plate forward, said feed roll being positioned so that it is out of engagement with the plate when the latter is in either its loading position or its unloading position, and means rendered operative by an initial forward movement of said plate from its loading position to operatively connect said plate with the feed roll, whereby a continued forward feeding movement of said plate for slitting the meat is given to it by said feed roll, said means being rendered inoperative by an initial manual backward movement of the plate from the unloading position.

7. A meat-slitting machine comprising a set of rotary slitting knives, means to rotate the knives, a guiding member beneath the knives, a meat-supporting plate movable back and forth on the guiding member between a loading position on one side of the knives and an unloading position on the other side of the knives, said plate having provision for manual operation, a driven feed roll, a presser roll movable to assume either an operative or an inoperative position, said presser roll, when in operative position, cooperating with the feed roll to feed the plate forward into unloading position, in which position said plate is out of engagement with the feed roll, said plate being adapted to be brought into operative feeding relation with the feed roll and presser roll by an initial manual forward movement from loading position, initial manual backward movement of the meat-supporting plate from the unloading position moving the presser roll into its inoperative position, whereby said plate is free to be returned manually to loading position.

JOSEPH P. SPANG.

CERTIFICATE OF CORRECTION.

Patent No. 2,191,732. February 27, 1940.

JOSEPH P. SPANG.

It is hereby certified that error appears in the printed specification of the above numbered patent requiring correction as follows: Page 2, second column, line 70, claim 1, for the words "a position of rest" read an unloading position; page 3, first column, line 6, same claim, for "position of rest" read unloading position; and that the said Letters Patent should be read with this correction therein that the same may conform to the record of the case in the Patent Office.

Signed and sealed this 2nd day of April, A. D. 1940.

(Seal)

Henry Van Arsdale,
Acting Commissioner of Patents.